United States Patent

Ross

[15] 3,681,780

[45] Aug. 1, 1972

[54] METHOD FOR AUTOMATICALLY DETECTING THE PRESENCE OF CYCLIC PULSES IN NOISE CORRUPTED PROCESS MEASUREMENTS

[72] Inventor: Charles W. Ross, Hatboro, Pa.

[73] Assignee: Leeds & Northrup Company, Philadelphia, Pa.

[22] Filed: Jan. 21, 1971

[21] Appl. No.: 108,538

[52] U.S. Cl. .................................... 444/1, 328/165
[51] Int. Cl. ........ H04b 15/00, G06f 7/02, G06f 15/56
[58] Field of Search .......................... 235/150, 151.1; 328/135–139, 165

[56] References Cited

UNITED STATES PATENTS 3,526,842  9/1970  Andrew ..................... 328/139 X
3,605,029  9/1971  Freedman ................. 328/139 X Primary Examiner—Eugene G. Botz
Assistant Examiner—Edward J. Wise
Attorney—William G. Miller, Jr. and Raymond F. MacKay

[57] ABSTRACT

A method for detecting the presence of cyclic pulses in process measurements having a high noise content by incrementing a counter and initiating a new time interval when the difference between the minimum and maximum values of the process measurement exceed the expected magnitude of the cyclic pulses then decrementing the counter upon the expiration of a preset maximum duration for the time interval when the difference between the minimum and maximum has not reached the expected magnitude of the cyclic pulses. A count within a predetermined range of the maximum allowable count is then indicative of the presence of the cyclic pulses in the process measurement.

4 Claims, 2 Drawing Figures

INVENTOR
CHARLES W. ROSS

BY William G. Miller Jr.

AGENT

METHOD FOR AUTOMATICALLY DETECTING THE PRESENCE OF CYCLIC PULSES IN NOISE CORRUPTED PROCESS MEASUREMENTS

BACKGROUND OF THE INVENTION

In the field or process measurement and control, the variations in the deviation of a particular measured process variable from its desired or average value often display random variations which may result from random process disturbances or from unwanted variations being introduced into the measuring system itself. These random variations are usually considered as noise since they represent variations to which the process control cannot advantageously respond. Such noise corrupted process measurements include, for example, the measurement of the area control error in electric power load distribution systems such as described, for example, in U.S. Pat. No. 2,688,728 issued to J. B. Carolus on Sept. 7, 1954. In load distribution systems there are frequently found periodic loads such as rolling mills and electric shovels whose loads are cyclic and which can be graphically represented by sequences of pulses shaped like truncated triangles or rounded rectangles. The period of these pulses will frequently vary depending upon the production schedule being followed and they can vary in magnitude over a range, for example, of 5–35 MW. It will be recognized that such a range of variation in power consumption may equal or exceed the normal range of the control error in the system to which the periodic load is connected thus creating a difficult control problem for the power distribution system.

In the past, the control systems utilized in power distribution systems have not taken steps to automatically modify the control strategy upon the appearance of a periodic load of the type above described but have instead accepted the resulting degraded control response. It is, of course, advantageous to modify the tuning of the control system which is regulating the generation in the distribution network so that the best possible control may be accomplished even in the presence of a cyclic load. In order to accomplish any necessary change in control strategy, it is of course necessary to know when the cyclic load has appeared on the system. In the absence of a direct signal from the cyclic load indicating its imminent occurrence, its presence must necessarily be detected by recognizing the load pattern which results from its operation, as by examining the pattern of the area control error in the load distribution system to which it is connected, or the load of a tie line supplying the area where the load is centered.

It is therefore an object of this invention to provide a means for detecting the appearance of a cyclic load in a noise corrupted process measurement when the cyclic load is of substantial magnitude with respect to the normal noise in the process measurement.

SUMMARY OF THE INVENTION

The present invention provides a method for automatically detecting the presence of cyclic pulses in a periodically sampled process measurement of high noise content when the pulses are of substantial magnitude with respect to the noise. The method includes as a first step the comparison of the minimum and maximum values of the process measurements made during the particular time interval then running. A count is incremented toward a preset maximum and there is initiated a new time interval when the difference resulting from the comparison of the minimum and maximum values exceeds a predetermined magnitude whose value approximates the expected magnitude of the cyclic pulses. The count is decremented toward a preset minimum when the difference between the minimum and maximum value of the process measurement does not exceed the preset magnitude and the maximum allowed time interval has expired. When the count is within a predetermined range of the maximum count, the presence of a cyclic pulse in the process measurement is indicated.

DESCRIPTION OF THE PREFERRED EMBODIMENT

Figure 1:
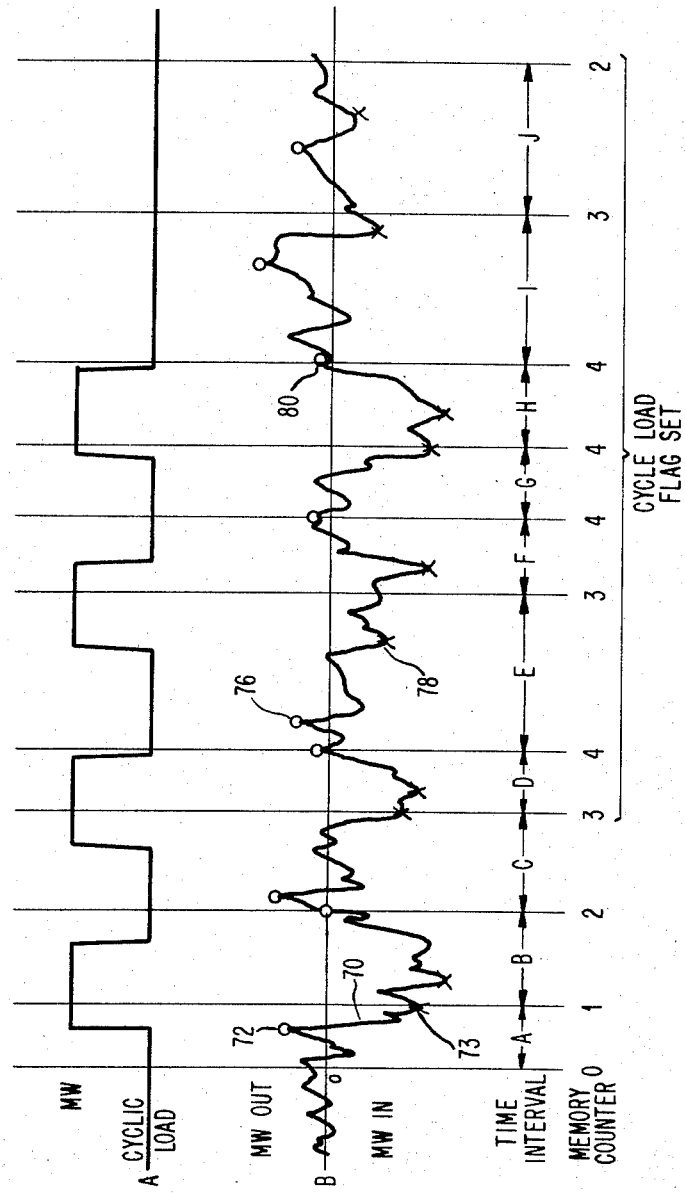
FIG. 1 is a graphic showing of the relationship between the cyclic load and the area control error which might be measured in the distribution system containing the cyclic load along with an indication of the applicable time intervals and the magnitude of the memory counts accumulated when the area control error is as shown.

Referring to FIG. 1, line A, there is graphically shown the cyclic load pattern which can result from the introduction of a rolling mill load on a power distribution system. On line B of FIG. 1 there is shown a graphical representation of the area control error which might be measured on a load distribution system to which the cyclic load shown in line A is connected. Thus, the problem of detecting the presence of the cyclic load shown in line A in the system whose area control error is as shown on line B becomes a matter of recognizing the characteristics of the pattern of the area control error measurement which indicates the presence of the cyclic load. The manner in which that pattern can be recognized will become evident from a description of a novel method as it is exemplified in the algorithm of FIG. 2 which will now be described.

Entry to the program for cycle detection is represented by the block 10 with the first step of the method carried out by the algorithm being indicated by block 12 wherein the process measurement S, as sampled, is compared with the running minimum of the sample value during the current time interval represented as SRMIN to see if the sampled value is less than the running minimum. If the sampled value is less than the running minimum, the sampled value S is placed in memory in the position reserved for the running minimum as indicated in block 16, and the program then proceeds as indicated by line 18.

If on the other hand the sampled value S is not less than the running minimum, the program goes to the next step in the sequence; namely, that shown in block 22 where the sampled value is compared with the running maximum SRMAX. As will be noted from FIG. 2, if the sampled value is greater than the running maximum, the program goes to the next step which would be the loading of the sampled value S into the memory position reserved for the running maximum SRMAX as indicated in block 26. The program then proceeds by way of line 18 to the next step as indicated in block 28 which step would also be followed if the sampled value was not greater than the running maximum SRMAX.

As indicated in block 28, the next step of the program is a comparison of the difference between the running maximum and the running minimum (SRMAX–SRMIN) and the value of the cyclic load which has been predetermined as that value which will cause the incrementing of a memory counter and the initiating of a new time interval. Thus, if the difference between the running maximum and the running minimum is greater that the cyclic load CYCLD, the program will advance to block 32 where the cyclic memory counter CMEMC is compared with the maximum storage value for the cycle memory counter CMEMCX to see if the cycle memory counter has reached its maximum value. If the counter has not reached its maximum value, the program then advances to the block 36 where the memory counter CMEMC is incremented by 1 to give a new value for CMEMC. On the other hand, if the maximum cycle memory count has been reached, the program will follow line 40 so that the memory counter will not be incremented.

If in the program step indicated in block 28 the running maximum differs from the running minimum by an amount which is not greater than the cyclic load, the program will advance to the step indicated in block 44 wherein the counter keeping track of the duration of the running time interval CYCLCT is incremented by 1 to give a new value for CYCLCT. The program then advances to the step indicated by block 46; namely, the comparison of the new value for CYCLCT with the value for CYCLPD which represents the maximum time interval. If the cyclic counter indicates a time interval greater than the maximum allowable time interval CYCLPD, the program then proceeds to the step indicated by block 48 where the value of CMEMC; namely, the value of the cycle memory counter is tested to see if it is greater than zero. If it is, the program then proceeds to the block 50 where the value CMEMC is decremented by 1.

If the step indicated by block 46 shows that the time interval has not exceeded its maximum duration, then the program follows line 52 to the exit point of the program.

Figure 2:
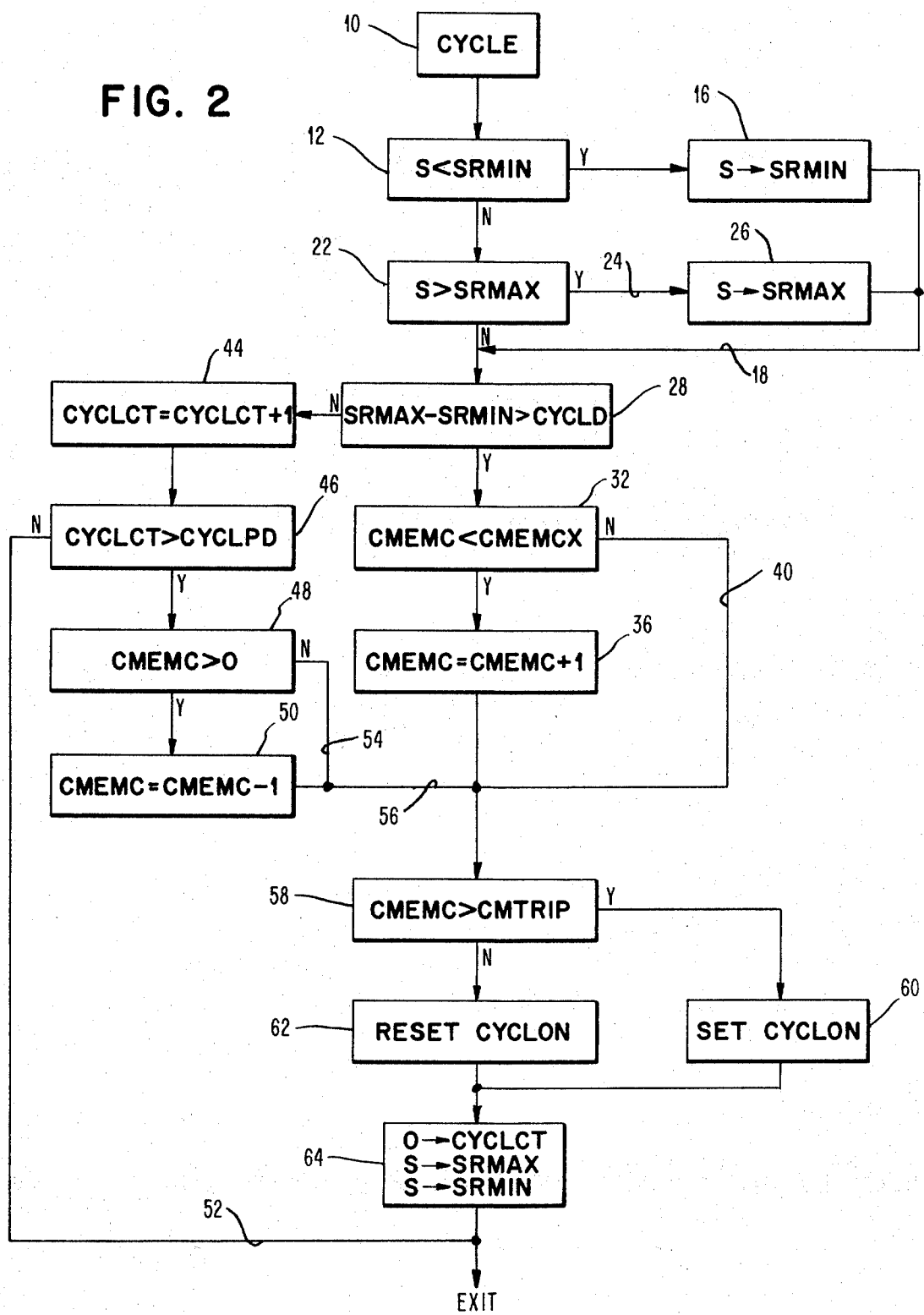
In FIG. 2 the flow diagram is shown of one algorithm that can be utilized as a basis for programming a general purpose digital computer to carry out the novel method.

As shown in FIG. 2, there are alternate paths for the program form the step shown in block 48. Should the value for CMEMC not be greater than zero, the program follows the path 54 directly to line 56 which leads to the next step in the program indicated in block 58.

The step indicated in block 58 is a comparison of the value of the cycle memory counter CMEMC with the value CMTRIP which represents the value of the cycle memory counter that is necessary to indicate the presence of the cyclic load. Thus, if CMEMC is greater than CMTRIP, the program then is effective to set CYCLON, or in other words, to set the flag indicating the cyclic load is on the system, as indicated by the block 60. The other alternative for the step shown in block 58 would be to proceed to the step shown in block 62, namely the resetting of CYCLON, thus indicating that the cyclic load is not connected to the system.

Following the setting or resetting of CYCLON as indicated in the blocks 60 and 62, respectively, it then is required to restart the comparison operation. This occurs whenever the difference between the running maximum and minimum exceeds the cyclic load CYCLD or at the end of the maximum time interval. To accomplish that restarting, a zero is placed in the storage position reserved for CYCLCT as indicated in block 64. Similarly, as indicated in block 64, the sampled value S is placed in a storage position for the running maximum SRMAX and the same value S is also placed in the storage position for the running minimum SRMIN after which the program exists. The next execution of this program will then start the running of a new time interval.

As shown in FIG. 1, the graphical representation of the area control error on line B contains only its normal noisy components prior to the connection of the cyclic load; however, upon connection of the cyclic load, the very rapid increase in power consumption causes the area control error to rapidly change as shown by the segment 70 of the area control error signal. It will be noted that prior to the connection of the cyclic load, the area control error had reached a maximum value at point 72 for the particular time interval A then running. That time interval began at the point indicated as having a memory count of zero. As indicated by the area control error signal, it reaches a minimum at point 73 which is sufficiently below the previous maximum so that the memory counter is incremented to 1 and a new time interval B is initiated.

As evidenced by the difference between the magnitude of the area control error at its minimum value and its maximum value in the time period B, it is evident that at the time the maximum occurs, the difference is greater than CYCLD and the result is that another increment is added to CMEMC in the step shown in block 36 in the algorithm of FIG. 2 so that CMEMC becomes 2 and a new time interval C is started by making CYCLCT zero (block 64). Likewise, during interval C the value SRMAX–SRMIN is greater than CYCLD before CYCLCT exceeds CYCLPD and thus the memory counter is again incremented. Assuming the CMTRIP is set at 2, then CYCLON is set (block 60) to indicate that the cyclic load has been detected.

During the next time interval D, the difference between the maximum and minimum values is again greater than CYCLD before the maximum time interval has elapsed and therefore the memory counter is incremented to 4 and the new time interval E is begun.

As shown in FIG. 1, the time interval E has a maximum value shown at point 76 and a minimum value shown at point 78 which do not differ by an amount greater than CYCLD and therefore the maximum time interval CYCLPD is allowed to time out by the successive incrementing of CYCLCT in block 44. There then follows a decrementing of the memory counter to a count of 3 which results from the program step shown in block 50. At the end of the interval E, the memory counter, CMEMC, contains 3 which is still greater than CMTRIP so that the flag CYCLON still remains set and a new time interval F is begun.

During the time interval F there is a sufficient difference between the minimum and maximum values for the area control error so that they exceed the value CYCLD thus causing an incrementing of the memory counter to 4 and the beginning of a new time interval G. In the time interval G there is likewise a detection of a minimum and maximum which differ by an amount greater than CYCLD; however, in this time interval CMEMC is no longer less than CMEMCX. In other words, the memory counter is no longer at a count less than its maximum count, namely 4, so that the program step of block 36 in FIG. 2 is omitted and no further incrementing of the memory counter occurs although a new interval is started; namely, the interval H. During the interval H, a similar situation occurs so that upon the appearance of the maximum value shown at point 80 a new time interval I is begun and the memory counter is again not incremented since it is at its maximum value. At the time as shown by line A, the cyclic load ceases.

As shown in FIG. 1, the time intervals I and J both include minimum and maximum values for the measured variable which do not differ by an amount which exceeds CYCLD and therefore the intervals I and J are of maximum duration, and as a result there is a decrementing after each of those intervals of the memory counter bringing the count down to 2 at the end of the interval J. Since the count of 2 is less than CMTRIP which represents the count necessary to indicate the presence of the cyclic load, in this example a count of 3, the program then causes a resetting of CYCLON to indicate that the cyclic load is no longer C.

From the above described example, as shown in FIG. 1, it will be evident that it has taken a period of time corresponding approximately to 1½ pulses of the rolling mill load before the presence of the load has been detected and it has taken approximately 2 maximum time intervals in order to detect the termination of that load. It will be evident that the important values which must be set will be the value CYCLD; that is, the maximum deviation during a particular time interval required to start a new time interval and to increment the counter as well as the value set for CYCLPD, the maximum time interval. While there is obviously leeway in the setting of both of these values with the effectiveness of this detector depending upon the intelligent selection of values for those quantities, it can nevertheless be stated that the setting for CYCLD should preferably be on the order of the expected amplitude of the cyclic load pulse while the maximum period of the time interval, namely CYCLPD, can normally vary form a period of one-half of a full period of a cyclic load to a full period of a cyclic load with the value depending upon the relative duration of the period between the cyclic pulses as compared with the duration of the pulses themselves.

What is claimed is:

1. The method for automatically detecting the presence of cyclic pulses in a process measurement of high random noise content when the cyclic pulses are of substantial magnitude with respect to the noise, and wherein each of the following steps are performed by automatic computing apparatus, comparing the minimum and maximum values of the process measurements since the initiation of the running time interval, incrementing a count toward a preset maximum and initiating the running of a new time interval when the difference resulting from said comparison exceeds a preset magnitude approximating the expected magnitude of said cyclic pulses, and decrementing said count toward a preset minimum when the difference resulting from said comparison does not exceed said preset magnitude upon the expiration of a preset maximum duration for the time interval then running, whereby a count within a predetermined range of said maximum count indicates the presence of said cyclic pulses in the process measurement.

2. The method set forth in claim 1 in which the maximum duration for a time interval is a sufficient portion of the period of said cyclic pulses to include at least one edge of the pulse occurring during each pulse period.

3. The method for automatically detecting the presence of cyclic pulses in a periodically sampled process measurement of high noise content when the cyclic pulses are of substantial magnitude with respect to the noise, and wherein each of the following steps are performed by automatic computing apparatus, comparing the sampled value with the minimum of the values sampled since the initiation of the running time interval, storing said sampled value as the new minimum if it is less than the previously stored minimum value, comparing the sampled value with the maximum of the values sampled since the initiation of the running time interval if said sampled value was not stored as the new minimum value, storing said sampled value as the new maximum if it exceeds in value the previously stored maximum value, comparing the stored minimum and maximum values, incrementing a memory counter toward a preset limited count and zeroing a time interval counter when the difference resulting from said comparison exceeds a preset magnitude approximating the expected magnitude of said cyclic pulses, incrementing said time interval counter when the difference resulting from said comparison does not exceed said preset magnitude, decrementing said memory counter toward a preset minimum count when said time interval counter reaches a preset maximum count, and producing a signal indicating the presence of said cyclic pulses when the count of said memory counter exceeds a certain value between said maximum and minimum count.

4. The method for automatically detecting the presence of cyclic pulses in a periodically sampled process measurement of high random noise content when the cyclic pulses are of substantial magnitude with respect to the noise, and wherein each of the following steps are performed by automatic computing apparatus, periodically comparing the minimum and maximum values of the process measurements sampled since the initiation of the running time interval, incrementing a count toward a preset maximum and initiating the running of a new time interval when the difference resulting from said comparison exceeds a preset magnitude approximating the expected magnitude of said cyclic pulses, and decrementing said count toward a preset minimum when the difference resulting from said comparison does not exceed said preset magnitude upon the expiration of a preset maximum duration for the time interval then running, whereby a count within a predetermined range of said maximum count indicates the presense of said cyclic pulses in the process measurement.

* * * * *